US012707314B2

(12) United States Patent
Babbellapati

(10) Patent No.: US 12,707,314 B2
(45) Date of Patent: Aug. 11, 2026

(54) DETERMINING INFORMATION RELATED TO A DESIGNATED DATA TRANSMISSION RATE FOR A WIRELESS LINK

(71) Applicant: Quantefi Corporation, Detroit, MI (US)

(72) Inventor: Syam Krishna Babbellapati, Munich (DE)

(73) Assignee: Quantefi Corporation, Detroit, MI (US)

( * ) Notice: Subject to any disclaimer, the term of this patent is extended or adjusted under 35 U.S.C. 154(b) by 0 days.

(21) Appl. No.: 18/408,547

(22) Filed: Jan. 9, 2024

(65) Prior Publication Data

US 2024/0146578 A1 May 2, 2024

Related U.S. Application Data

(63) Continuation of application No. 16/268,534, filed on Feb. 6, 2019, now Pat. No. 11,870,608.
(Continued)

(51) Int. Cl.
*H04W 28/02* (2009.01)
*H04L 12/66* (2006.01)
(Continued)

(52) U.S. Cl.
CPC ......... *H04W 28/0205* (2013.01); *H04L 12/66* (2013.01); *H04L 41/0896* (2013.01);
(Continued)

(58) Field of Classification Search
None
See application file for complete search history.

(56) References Cited

U.S. PATENT DOCUMENTS 11,870,608 B2 1/2024 Babbellapati
2001/0050909 A1* 12/2001 Taketsugu ............ H04W 28/22 370/352

(Continued)

FOREIGN PATENT DOCUMENTS

JP 2014179869 A 9/2014

OTHER PUBLICATIONS

European Search Report for European Application No. 23208226.3, mailed Feb. 27, 2024, 13 Pages.

(Continued)

*Primary Examiner* — Umar Cheema
(74) *Attorney, Agent, or Firm* — Buchalter; Jason W. Croft

(57) ABSTRACT

A network gateway device for determining information related to a designated data transmission rate for a wireless link includes at least one means for communicating for communicating with a wireless modem means. The network gateway device includes a means for controlling configured for obtaining information related to an instantaneous data transmission capacity of the wireless link via the at least one means for communicating. The means for controlling is configured for determining the information related to the designated data transmission rate based on the information related to the instantaneous data transmission capacity of the wireless link. The designated data transmission rate is lower than an average data transmission capacity of the wireless link. An availability of the designated data transmission rate over the wireless link is higher than an availability of the average data transmission capacity over the wireless link.

20 Claims, 6 Drawing Sheets

Related U.S. Application Data

(60) Provisional application No. 62/643,869, filed on Mar. 16, 2018.

(51) Int. Cl.

| | |
|---|---|
| ***H04L 41/0896*** | (2022.01) |
| ***H04L 41/16*** | (2022.01) |
| ***H04L 47/22*** | (2022.01) |
| ***H04W 88/16*** | (2009.01) |

(52) U.S. Cl.

CPC .............. *H04L 41/16* (2013.01); *H04L 47/22* (2013.01); *H04W 28/0231* (2013.01); *H04W 28/0236* (2013.01); *H04W 88/16* (2013.01); *H04W 28/0242* (2013.01)

(56) References Cited

U.S. PATENT DOCUMENTS

| | | | | |
|---|---|---|---|---|
| 2003/0053482 | A1 | 3/2003 | Li | |
| 2006/0245357 | A1 * | 11/2006 | Ilan | H04L 12/5602 370/473 |
| 2008/0304454 | A1 | 12/2008 | Zhong et al. | |
| 2010/0214923 | A1 | 8/2010 | Vivanco et al. | |
| 2016/0358444 | A1 | 12/2016 | Lundy | |
| 2017/0163333 | A1 | 6/2017 | Breiling et al. | |
| 2017/0272317 | A1 | 9/2017 | Singla et al. | |
| 2019/0149263 | A1 * | 5/2019 | Dong | H04L 1/0026 370/329 |
| 2019/0174337 | A1 | 6/2019 | Prasad et al. | |
| 2019/0362245 | A1 | 11/2019 | Buda et al. | |

OTHER PUBLICATIONS

Extended European Search Report for European Application No. 18179285.4, mailed Jan. 17, 2019, 14 Pages.

Notice of Allowance for U.S. Appl. No. 16/268,534, dated Aug. 23, 2023, 8 Pages.

Communication Pursuant to Article 94(3) EPC for European Patent Application No. 18179285.4, dated Feb. 15, 2023, 7 Pages.

Communication Pursuant to Article 94(3) EPC for European Patent Application No. 18179285.4, mailed Jun. 29, 2021, 13 Pages.

Office Action of European Patent Application No. 23208226.3 mailed Mar. 16, 2026, 13 pages.

* cited by examiner

DETERMINING INFORMATION RELATED TO A DESIGNATED DATA TRANSMISSION RATE FOR A WIRELESS LINK

CROSS-REFERENCE TO RELATED APPLICATIONS

This application is a continuation of U.S. patent application Ser. No. 16/268,534, filed Feb. 6, 2019, titled "Determining Information Related to a Designated Data Transmission Rate for a Wireless Link", which claims priority to U.S. Provisional Application No. 62/643,869, filed Mar. 16, 2018, titled "Method for handling Quality of Service in 5G based Fixed Wireless home routers", and further claims priority to European Patent Application No. 18179285.4 filed Jun. 22, 2018, titled "Apparatuses, Devices, Methods And Computer Programs For Determining Information Related To A Designated Data Transmission Rate For A Wireless Link", all of which are incorporated herein by reference in their entireties.

FIELD

Examples relate to apparatuses, devices, methods and computer programs for determining information related to a designated data transmission rate for a wireless link and to a network gateway and to a network entity, more specifically, but not exclusively, to determining the designated data transmission rate for the wireless based on information related to an instantaneous data transmission capacity of the wireless link.

BACKGROUND

5th-generation mobile communication systems (5G, next generation of LTE (Long Term Evolution)/4G) may offer Fixed Wireless broadband access (as one of the 3 primary tenets of 5G) to user homes with data rates of up to 10 Gbps. Due to the requirement of high data rates, Wireless carriers may use spectrum available in millimeter Wave (mmWave, 28 GHz-60 GHz) to provide high data rates like 10 Gbps bandwidth. However, mmWave may suffer from high attenuation even in the fixed wireless access scenario. The 5G WAN link as perceived by the end user may significantly vary in the day/hour—posing challenges around how Quality of Service (QoS) could be handled in such varying bandwidth.

The majority of the broadband services utilized today are built on top of the TCP/IP protocol (Traffic Control Protocol/Internet Protocol). TCP/IP may enable a reliable delivery of payload data based on re-transmitting any data packets not being acknowledged by the receiver within a certain, variable time-span. This time-span, typically expressed as "window size", may be adjusted slowly to possibly varying end-to-end data rates. In a 5G environment with rapidly changing rates due to environmental conditions, TCP/IP implementations may be too slow to follow the data-rate changes.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
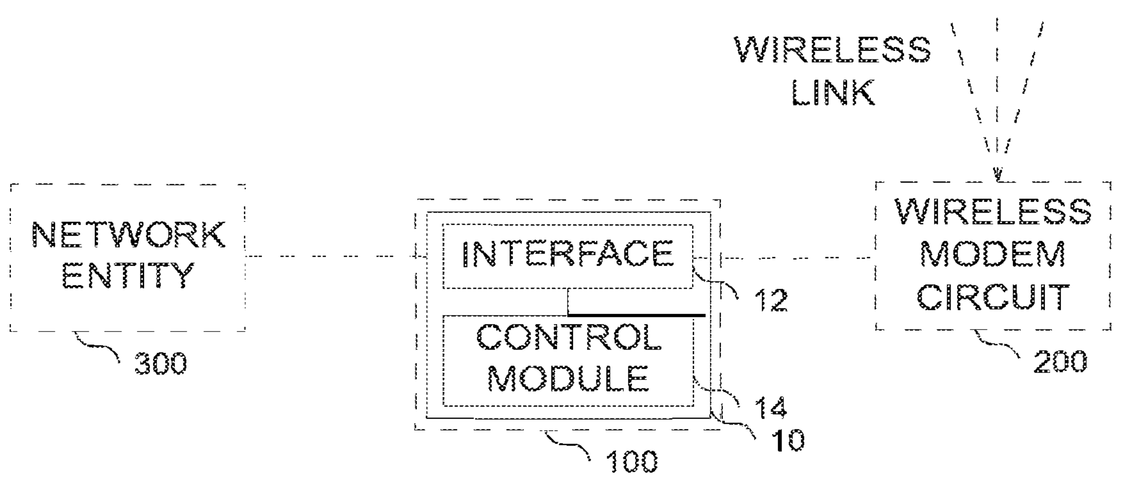
FIG. 1 shows a block diagram of an example of a network gateway apparatus or of a network gateway device for determining information related to a designated data transmission rate for a wireless link.

FIG. 1 shows a block diagram of an example of a network gateway apparatus 10 or of a network gateway device 10 for determining information related to a designated data transmission rate for a wireless link. The described network gateway apparatus 10 corresponds to a network gateway device 10. A wireless modem circuit 200, as introduced in the following, corresponds to a wireless modem means 200. The components of the network gateway device 10 are defined as component means which correspond to the respective structural components of the network gateway apparatus 10. Examples further provide the network gateway 100 comprising the network gateway apparatus 10 and the network gateway 100 comprising the network gateway device 10. In at least some examples, the network gateway 100 further comprises the wireless modem circuitry 200 (e.g. in a so-called 1-box approach as a combined modem router). In some examples, the network gateway 100 may be a stationary network gateway 100, e.g. a home network gateway, a home router, a stationary hotspot or a Customer Premises Equipment (CPE). Alternatively, the network gateway 100 may be a mobile network gateway 100, e.g. a mobile hotspot or a mobile router. In at least some examples, the network gateway is a fixed wireless home router, e.g. a stationary home router, which is connected to the inter-net via a wireless connection (e.g. the wireless link).

The apparatus 10 comprises at least one interface 12 for communicating with a wireless modem circuit 200. The apparatus 10 further comprises a control module 14. The control module 14 is configured to obtain information related to an instantaneous data transmission capacity of the wireless link via the at least one interface 12. The control module 14 is further configured to determine the information related to the designated data transmission rate based on the information related to the instantaneous data transmission capacity of the wireless link. The designated data transmission rate is lower than an average data transmission capacity of the wireless link. An availability of the designated data transmission rate over the wireless link is higher than an availability of the average data transmission capacity over the wireless link. In at least some examples, the at least one interface 12 may correspond to a means for communication 12. The control module 14 may correspond to a means for controlling 14. The at least one interface 12 is coupled to the control module 14.

Figure 2:
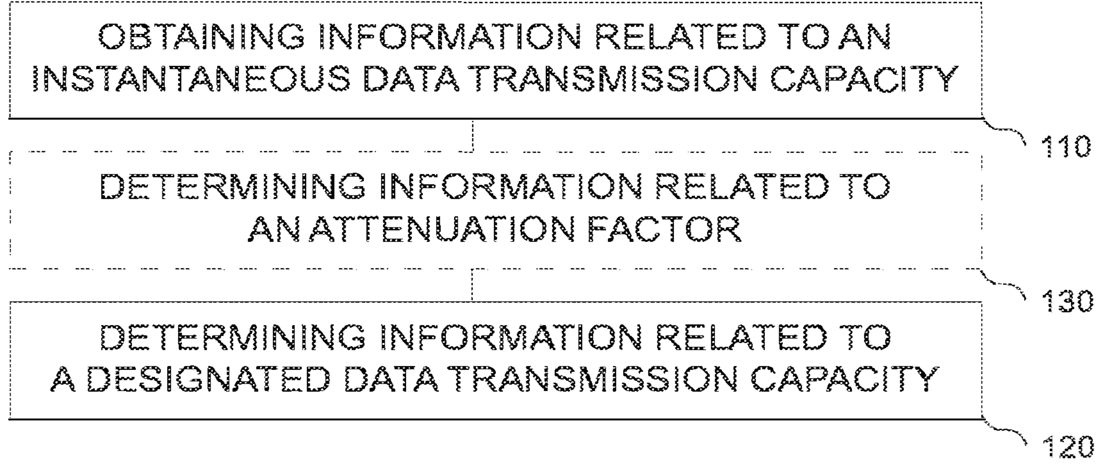
FIG. 2 shows a flow chart of an example of a method for a network gateway method for determining information related to a designated data transmission rate for a wireless link.

FIG. 2 shows a flow chart of an example of a corresponding method for a network gateway method for determining information related to a designated data transmission rate for a wireless link. The method comprises obtaining 110 information related to an instantaneous data transmission capacity of the wireless link from a wireless modem circuitry 200. The method further comprises determining 120 the information related to the designated data transmission rate based on the information related to the instantaneous data transmission capacity of the wireless link. Optionally, as indicated by the dashed lines, the method may further comprise determining 130 information related to an attenuation factor.

The following description relates to both the apparatus and network gateway of FIG. 1 and to the method of FIG. 2.

Determining the designated data transmission rate may enable transmitting data at a data transmission rate, at which a high throughput is provided with a reduced number of re-transmissions due to a fluctuating data transmission capacity of the wireless link.

In general, the designated data transmission rate for the wireless link may be a data transmission rate, which may be fast enough, but not so fast, that changes in the data transmission capacity of the wireless link cause frequent retransmissions or transmission errors in data transmissions over the wireless link. For example, the information related to the designated data transmission rate may indicate an estimated data rate over the wireless link, at which retransmissions due to the fluctuations in a data transmission capacity of the wireless link are less frequent compared with data transmission over the wireless link at a higher data rate. For example, the designated data transmission rate may be higher than a data transmission capacity of the wireless link less than 10% (or less than 5%, less than 4%, less than 3%, less than 2%, less than 1%) of the time. The designated data transmission rate is lower than an average data transmission capacity of the wireless link. The designated data transmission rate may be lower than a windowed average data transmission capacity of the wireless link, e.g. by a safety margin, e.g. lower than a windowed average data transmission capacity of the wireless link during a pre-defined time span prior to determining the information related to the designated data transmission rate to the network entity or prior to receiving the information related to the instantaneous data transmission capacity of the wireless link. For example, the designated data transmission rate may be updated every n minutes, and the designated data transmission rate may be lower than an average data transmission capacity of the wireless link of the previous n minutes.

An availability of the (entire) designated data transmission rate over the wireless link is higher than an availability of the (entire) average data transmission capacity (e.g. of a data transmission rate corresponding to the average data transmission capacity) over the wireless link. For example, the instantaneous data transmission capacity may fall below the average data transmission capacity more often than below the designated data transmission rate. Over a given time-span, the designated data transmission rate may be available for a higher percentage of the time-span than a data transmission rate corresponding to the average data transmission capacity.

For example, the information related to the designated data transmission rate may comprise a (digital) version of the designated data transmission rate. Additionally or alternatively, the information related to the designated data transmission rate may comprise one or more elements of the group of a quality of service indicator for transmissions at the designated data transmission rate, information related to one or more queues of the wireless modem circuit 200 for transmissions at the designated data transmission rate, information related to a recommended traffic shaping for data transmissions at the designated data transmission rate and information related to a window size (e.g. a TCP window size) for data transmissions at the designated data transmission rate.

The wireless link may be a wireless link between the wireless modem circuit and a base station, e.g. base station of a mobile communication system/a mobile communication network. A data transmission capacity of the wireless link may fluctuate over time, e.g. due to moving objects or due to weather. For example, the data transmission capacity of the wireless link may fluctuate over time due to rain. This may be due to the wireless link operating at a high frequency. For example, the wireless link may be based on a carrier frequency. The carrier frequency may be higher than 3 GHz (or higher than 4 GHz, higher than 5 GHz, higher than 10 GHz, higher than 15 GHz). For example, the wireless link may be a millimeter wave-based wireless link (e.g. a wireless link having a carrier frequency between 30 GHz and 300 GHz). For example, the carrier frequency of the wireless link may be based on one of a 28 GHz frequency band, a 38 GHz frequency band, a 60 GHz frequency band and the E-band (71-76 GHz and 81-86 GHz). In at least some examples, the wireless link may be a wireless link for connecting the wireless modem circuit 200 to a mobile communication system/mobile communication network. For example, the wireless link is based on a 5th generation cellular mobile communication network.

The at least one interface 12 may correspond to one or more inputs and/or outputs for receiving and/or transmitting information, which may be in digital (bit) values according to a specified code, within a module, between modules or between modules of different entities.

The at least one interface 12 may be configured to communicate with the wireless modem circuit using a wired connection, e.g. one of a USB (Universal Serial Bus) connection, a PCIe (Peripheral Communicating Interface express) connection or an Ethernet connection. Alternatively, the at least one interface 12 may be configured to communicate with the wireless modem circuit using a wireless connection, e.g. a WLAN (Wireless Local Area Network) connection, e.g. based on IEEE (Institute of Electrical and Electronics Engineers) standard 802.11. In some examples, the network gateway 100 may comprise the network gateway apparatus and the wireless modem circuit (so-called 1-box approach). In this case, the at least one interface 12 may be configured to communicate with the wireless modem circuit using a wired connection. Alternatively, the network gateway 100 and the wireless modem circuit 200 may be separate devices (so-called 2-box approach). The at least one interface 12 may be configured to communicate with the wireless modem circuit using a wired (e.g. Ethernet) or wireless (e.g. WLAN) connection.

In at least some examples, the wireless modem circuit 200 is a wireless modem circuit for a mobile communication system/mobile communication network, e.g. for a cellular mobile communication system. In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

For example, the wireless modem circuit 200 may be a wireless modem circuit for a 5th generation cellular mobile communication network/mobile communication system. Alternatively or additionally, the wireless modem circuit 200 may be a wireless modem circuit for a millimeter wave-based mobile communication network/mobile communication system. The wireless modem circuit 200 may be configured to communicate via the mobile communication system/mobile communication network, e.g. using the wireless link.

In examples, the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

For example, the control module 14 may be configured to receive the information related to the instantaneous data transmission capacity of the wireless link via the at least one interface 12, e.g. from the wireless modem circuit 200. Alternatively, the control module 14 may be configured to determine the information related to the instantaneous data transmission capacity of the wireless link, e.g. based on information related to a modulation of the wireless link, based on information related to a communication protocol of the wireless link or based on information related to an attenuation of the wireless link, which may be received from the wireless modem circuit 200 or from a base station.

In at least some examples, a data transmission capacity of the wireless link is a data transmission rate, at which data can be transmitted from the wireless modem to a base station of the mobile communication system/mobile communication network. The data transmission capacity may be the (maximal) data transmission rate, at which data may be transmitted due to a current/instantaneous attenuation and modulation of the wireless link. In some examples, the data transmission capacity may be further based on a load of the mobile communication system, e.g. based on the wireless resources assigned to the wireless modem circuit 200. If the mobile communication system has a high load (in a cell associated with the wireless modem circuit 200), the data transmission capacity may be lower than if the mobile communication system has a low load (in the cell associated with the wireless modem circuit). The data transmission capacity may be the (maximal) data transmission rate, at which data may be transmitted due to a current/instantaneous attenuation and modulation of the wireless link and due to a load of the mobile communication system (e.g. in a cell associated with the wireless modem circuit 200).

The instantaneous data transmission capacity may be a data transmission capacity currently available via the wireless link, e.g. within the last second, or within a time span less than 10 seconds ago. The instantaneous data transmission capacity may be averaged over a time span, e.g. over 100 ms, over 1 s, over 2 s, over 10 s. The instantaneous data transmission capacity may be based on a time span that is less than 20 s (or less than 10 s, less than 5 s, less than 2 s) previous to obtaining the information related to the instantaneous data transmission capacity of the wireless link.

In various examples, the information related to the instantaneous data transmission capacity may comprise a (binary) value or approximation of the instantaneous data transmission capacity of the wireless link. Alternatively or additionally, the information related to the instantaneous data transmission capacity may comprise one or more elements of the group of information related to a modulation of the wireless link that the instantaneous data transmission capacity is based on, information related to a bandwidth used for the wireless link during a time span of the instantaneous data transmission capacity and/or information related to a wireless technology or protocol used for the wireless link during the time span of the instantaneous data transmission capacity.

In at least some examples, the control module may be configured to receive the information related to the instantaneous data transmission capacity via a wired connection (e.g. PCIe, USB or Ethernet) or via a wireless connection (e.g. WLAN).

The control module 14 is configured to determine the information related to the designated data transmission rate based on the information related to the instantaneous data transmission capacity of the wireless link. For example, the control module 14 may be configured to determine a "safe" data transmission rate (e.g. a data transmission rate, at which few retransmissions occur) for data transmissions via the wireless link based on the information related to the instantaneous data transmission rate of the wireless link.

In at least some examples, the data transmission capacity of the wireless link fluctuates over time due to changes in an attenuation of the wireless link. For example, the attenuation of the wireless link may change due to objects moving in the vicinity of the wireless modem circuit 200 and the base station, or the attenuation of the wireless link may change due to the weather, e.g. when it's raining. The control module 14 may be configured to determine information related to an extent of the fluctuation due to the changes in attenuation of the wireless link based on the information related to the instantaneous data transmission capacity of the wireless link. For example, the information related to the extent of the fluctuation may indicate an average or maximal amplitude of the fluctuation. For example, the information related to the extent of the fluctuation may indicate a safety margin (e.g. an attenuation factor), which may be left from a (maximal) data transmission capacity of the wireless link. The control module 14 may be configured to determine information related to an attenuation factor based on the information related to the extent of the fluctuation due to the changes in attenuation of the wireless link. The information related to the extent of the fluctuation (e.g. the attenuation factor) may indicate a percentage or an absolute value (e.g. in Mbit/s) to subtract from the (maximal) data transmission capacity of the wireless link for determining the information related to the designated data transmission rate. The control module 14 may be configured to determine the information related to the designated data transmission rate based on the information related to the extent of the fluctuation due to the changes in attenuation of the wireless link. Based on the extent of the fluctuations, a "safe data transmission rate" (e.g. the designated data transmission rate) may be determined, at which re-transmissions due to the changing data transmission capacity of the wireless link are reduced. The control module 14 may be configured to determine the information related to the designated data transmission rate based on a maximal data transmission capacity of the wireless link and based on the information related to the attenuation factor. The attenuation factor may be used as a coarse-grained approximation of the attenuation to determine the information related to the designated data transmission rate. For example, the maximal data transmission capacity may be a data transmission capacity that may be reached, if reductions in the data transmission capacity due to attenuation are zero or negligible.

In at least some examples, the control module 14 is configured to repeat determining the information related to the designated data transmission rate based on an update rate for the designated data transmission rate. For example, the update rate for the designated data transmission rate may be once every n seconds, e.g. once every 1, 2, 4, 5, 8, 10, 16, 30, 32, 60 or 120 seconds. The update rate for the designated data transmission rate may be at least 2 times (or at least 4 times, at least 5 times, at least 8 times, at least 10 times, at least 20 times, at least 100 times) lower than an update rate of the information related to an instantaneous data transmission capacity. For example, the update rate for the designated data transmission rate may be at most once every ten seconds (e.g. every 10 seconds, every 20 seconds, every 30 seconds, every minute). Choosing a slow update rate may enable more consistent data transmissions with fewer retransmissions.

In at least some examples, the information related to the instantaneous data transmission capacity of the wireless link comprises information related to one or more environmental factors related to the wireless link of the wireless modem circuit. Alternatively or additionally, the control module 14 may be configured to obtain or receive the information related to the one or more environmental factors, e.g. from the wireless modem circuitry, from a base station associated with the wireless modem or via the wireless link (e.g. via the Internet). The control module 14 may be further configured to determine the information related to the designated data transmission rate based on the information related to the one or more environmental factors. The one or more environmental factors may be used to estimate or predict the attenuation of the wireless link, e.g. due to bad weather, due to moving objects or due to a changing landscape of trees. For example, the control module 14 may be configured to determine an environmental prediction factor based on the one or more environmental factors. The environmental prediction factor may indicate a percentage of the data transmission capacity of the wireless link, which may be susceptible to fluctuations in the wireless link due to the one or more environmental factors.

For example, the control module 14 may be configured to estimate an attenuation of the wireless link based on the one or more environmental factors. The control module 14 may be configured to determine information related to an expected attenuation on the wireless link based on the information related to the one or more environmental factors. The expected attenuation may be related to or associated with a time span, during which the designated data transmission rate is valid or to be used.

In at least some examples, the information related the environmental factors of the wireless link may comprise one or more elements of the group of information related to an attenuation of the wireless link, weather information, information related to a location of the wireless modem circuit 200, information related to a location of a base station transceiver associated with the wireless link, information related to objects between the wireless modem circuit 200 and the base station (e.g. traffic or trees), information related to a time and date, information related to an available spectrum, information related to a pilot contamination of a signal pilot on the wireless link, information related to previous environmental factors and corresponding attenuation, and information related to one or more events. For example, in a simple example, the information related to the expected attenuation (for the "new" designated data transmission rate) may be estimated based on the information related to the attenuation of the wireless link received within the information related to the one or more environmental factors, which may be related to a pre-defined time span prior to receiving the information related to the instantaneous data transmission capacity of the wireless link. For example, the expected attenuation may be estimated based on the instantaneous data transmission rate and the information related to the attenuation of the wireless link received within the information related to the one or more environmental factors. In a more complex example, the weather may be taken into account. The expected attenuation may be estimated based on the weather information. For example, if the weather information indicates, that it is raining, the expected attenuation may be higher, as rain may deteriorate the wireless link.

In various examples, e.g. to cover more complex relationships between environmental factors and attenuation, the information related to the designated data transmission rate to the network entity may be determined based on a learning function. For example, the control module 14 may be configured to determine the information related to the expected attenuation on the wireless link based on the information related to the one or more environmental factors and based on a learning function. The learning function may be used to learn from a relationship between the one or more environmental factors and an attenuation of the wireless link at an earlier time, e.g. to predict the attenuation for similar environmental factors at a current or future time.

The learning function may be based on previous information related to the one or more environmental factors related to the wireless link. For example, for a given time span, the control module 14 may be configured to compare the (actual) attenuation of the wireless link with the one or more environmental factors to determine or refine the learning function. In various examples, one or more inputs of the learning function may be based on one or more elements of the group of information related to an attenuation of the wireless link, weather information, information related to a location of the wireless modem circuit 200, information related to a location of a base station transceiver associated with the wireless link, information related to objects between the wireless modem circuit 200 and the base station (e.g. traffic or trees), information related to a time and date, information related to an available spectrum, information related to a pilot contamination of a signal pilot on the wireless link, information related to previous environmental factors and corresponding attenuation, and information related to one or more events. An output of the learning function may be based on an attenuation of the wireless link, e.g. at an earlier time. For example, the learning function may be based on a machine learning algorithm, e.g. based on an artificial neural network. The learning function may be based on a recurrent neural network (RNN), based on a convolutional neural network (CNN) or a combined CNN-RNN. The artificial neural network may be trained based on the one or more environmental factors. The control module 14 may be configured to use the one or more environmental factors (of the previous information related to the one or more environmental factors) as inputs and the (previous) attenuation of the wireless link as output to train the artificial neural network. Alternatively, the artificial neural network may be trained by an external entity, e.g. the wireless modem circuit 200 or the base station. For example, the artificial neural network may be trained such, that the expected attenuation of the wireless link can be determined based on the (current) information related to the one or more environmental factors.

In at least some examples, the control module 14 is configured to determine information related to an attenuation factor based on the information related to the expected attenuation on the wireless link. For example, the attenuation factor may be a factor that the maximal data transmission capacity may be multiplied with to determine the information related to the designated data transmission rate to the network entity. For example, under normal conditions (e.g. good weather, normal traffic), the attenuation factor may be 0.2 (or 20%), under less ideal conditions (e.g. rain, heavy traffic), the attenuation factor (comprising an environmental prediction factor) may be 0.5 (or 50%, e.g. 0.2 for the attenuation variation under normal conditions and 0.3 for the environmental prediction factor). The designated data transmission capacity may be equal to or derived from the (maximal) data transmission capacity of the wireless capacity multiplied by $(1-0.2)$ or $(1-0.5)$ (see later examples).

In some examples, the control module 14 may be configured to determine the information related to the designated data transmission rate based on one or more data transmission parameters of the wireless link. For example, the control module 14 may be configured to receive the one or more data transmission parameters of the wireless link from the wireless modem circuit 200 or from the base station. The one or more data transmission parameters may be parameters of the mobile communication system/mobile communication network, e.g. one or more elements of the group of a Committed Information Rate (CIR), a Committed Burst Size (CBS), an Excess Information Rate (EIR) and an Excess Burst Size (EBS). For example, the one or more data transmission parameters may specify the maximal data transmission capacity of the wireless link. In some examples, the information related to the instantaneous data transmission capacity of the wireless link may comprise the one or more data transmission parameters of the wireless link. The data transmission parameters may be used to factor in an expected or maximal data transmission capacity of the wireless link.

In various examples, the control module 14 may be configured to determine the information related to the designated data transmission rate based on a desired energy profile for the wireless modem circuitry 200. For example, if the desired energy profile for the wireless modem circuitry 200 indicates, that the wireless modem circuitry 200 is in an "energy saving" profile, the designated data transmission rate may be chosen lower to enable using less, but more favorable spectrum and thereby reducing an energy usage, or the designated data transmission rate may be chosen higher to enable bursts of data transmissions, while conserving energy in-between.

In at least some examples, the control module 14 is configured to transmit a control signal to the wireless modem circuit based on the information related to the designated data transmission rate.

The control module 14 may be configured to affect a wireless resources usage of the wireless modem for the wireless link and/or a wireless technology usage of the wireless modem circuit 200 for the wireless link using the control signal. This may enable an adaptation of the wireless link based on data transmission requirements of the network gateway, e.g. by preferring a stable, but slower wireless link to a faster, but less stable wireless link. For example, the control module 14 may be configured to affect the wireless modem circuit 200 to request more wireless resources (e.g. more frequency resources/spectrum or more time resources) or to request better wireless resources (e.g. better frequency resources/spectrum, better spatial resources, a more precise beam-forming) for the wireless link. Alternatively or additionally, the control module 14 may be configured to affect the wireless modem circuit 200 to change a wireless technology usage of the modem circuit 200 for the wireless link, e.g. to affect a switch from a 5G-based wireless link to a (possibly more consistent) 4G-based wireless link, or to switch from a mmWave-based wireless link to a sub-10 GHz-based wireless link.

In at least some examples, the control module 14 is configured to provide a data transmission to the wireless modem circuit 200 for transmission via the wireless link based on the information related to the designated data transmission rate. This may enable transmitting data at or below the designated data transmission rate to avoid retransmissions on the wireless link and thus enable a reduced delay at an adequate throughput. For example, the control module 14 may be configured to limit a data transmission rate of the data transmission based on the information related to the designated data transmission rate to the network entity. Additionally or alternatively, the control module 14 may be configured to alter the data transmission based on the information related to the designated data transmission rate to the network entity, e.g. by affecting a change in the quality of media of the data transmission. In some examples, the control module 14 may be configured to determine one or more data transmission parameters based on the information related to the designated data transmission rate to the network entity, e.g. a (TCP) window size of the data transmission, a timeout threshold of the data transmission or a retransmission behavior of the data transmission.

The at least one interface 12 may be further configured to communicate with a network entity 300 via a local network connection, e.g. via an (Ethernet-based) Local Area Network or a Wireless Local Area Network. In some examples, the control module 14 may be configured to receive the data transmission from a network entity 300, and to forward (to provide) the data transmission to the wireless modem circuit based on the information related to the designated data transmission rate to the network entity. Transmitting the information related to the designated data transmission rate to the network entity may enable the network entity to adapt its data transmission behavior based on the designated data transmission rate. The control module 14 may be configured to throttle the data transmission of the network entity 300 in forwarding the data transmission to the wireless modem 200 based on the information related to the designated data transmission rate to the network entity. Alternatively, the control module 14 may be configured to re-package the data transmission of the network entity 300 in forwarding the data transmission to the wireless modem 200 based on the information related to the designated data transmission rate to the network entity, e.g. by changing a (TCP) window size of the data transmission. For example, the control module 14 may be configured to control a traffic shaping and/or a prioritization of the data transmission based on the information related to the designated data transmission rate. In at least some examples, the control module 14 may be configured to transmit a plurality of data transmissions to the wireless modem circuit 200 at the same time. The control module 14 may be configured to control a traffic shaping and/or a prioritization of the plurality of data transmissions, so that the overall data transmission rate of the plurality of data transmissions corresponds to the designated data transmission rate.

In some examples, the control module 14 may be configured to provide the information related to the designated data transmission rate to the network entity 300. The control module 14 may be configured to receive the data transmission from the network entity 300 based on the information related to the designated data transmission rate to the network entity. For example, the information related to the designated data transmission rate comprise information related to a (recommended or mandated) window size of a of a communication protocol of the data transmission (e.g. a recommended or mandated TCP window size) for the data transmission. A window size of the data transmission may be based on the information related to the window size of a of a communication protocol of the data transmission. For example, one or more elements of the group of a communication protocol of the data transmission, a window size of a communication protocol of the data transmission, a bit rate of the data transmission and a content of the data transmission may be based on the information related to the designated data transmission rate. The information related to the designated data transmission rate may comprise one or more elements of the group of information related to a (recommended or mandated) communication protocol of the data transmission, information related to a (recommended or mandated) window size of a communication protocol of the data transmission, information related to a (recommended or mandated) bit rate of the data transmission and information related to a (recommended or mandated) content (quality) of the data transmission based on the information related to the designated data transmission rate.

Figure 3:
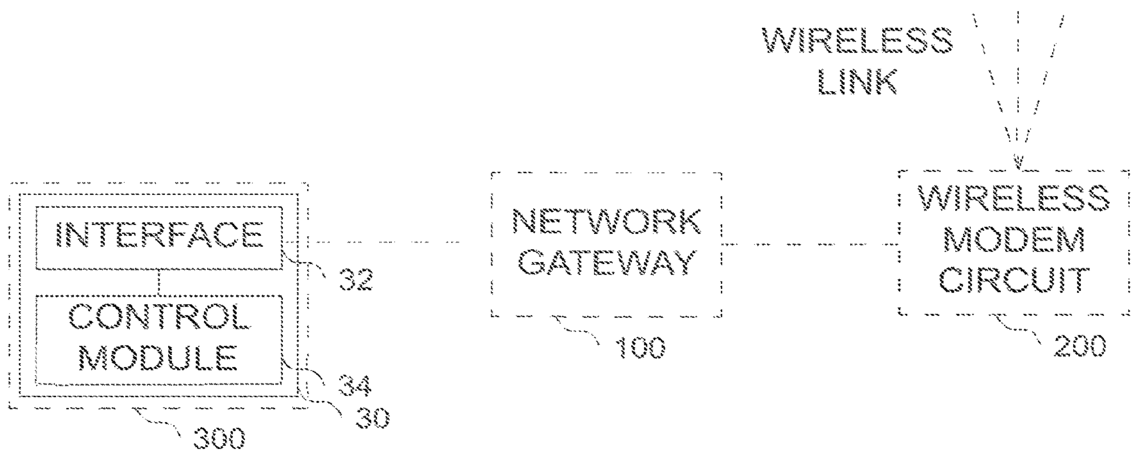
FIG. 3 shows a block diagram of an example of an apparatus or a device for a network entity.

FIG. 3 shows a block diagram of an example of an apparatus 30 or a device 30 for a network entity 300. The described apparatus 30 for the network entity 300 corresponds to a device 30 for a network entity 300. The components of the device 30 are defined as component means which correspond to the respective structural components of the apparatus 30. Examples further provide the network entity 300 comprising the apparatus 30 or the device 30. In some examples, the network entity 300 may be stationary network entity 300, e.g. a home personal computer or an entity or network device of the Internet of Things (IoT). Alternatively, the network entity 300 may a mobile network entity, e.g. a smartphone, a tablet, a mobile computer, or a wearable device. The apparatus 30 comprises at least one interface 32 configured to communicate with a network gateway 100 (e.g. the network gateway apparatus 10 of FIG. 1) via a local network connection. The at least one interface 32 corresponds to a means for communicating of the device 30. The apparatus 30 further comprises a control module 34, which corresponds to a means for controlling 34 of the device 30. The control module 34 is configured to receive information related to a designated data transmission rate for a wireless link from the network gateway 100 via the at least one interface 32. The control module 34 is configured to transmit a data transmission to the network gateway 100 via the at least one interface 32 based on the information related to the designated data transmission rate for the wireless link.

Figure 4:
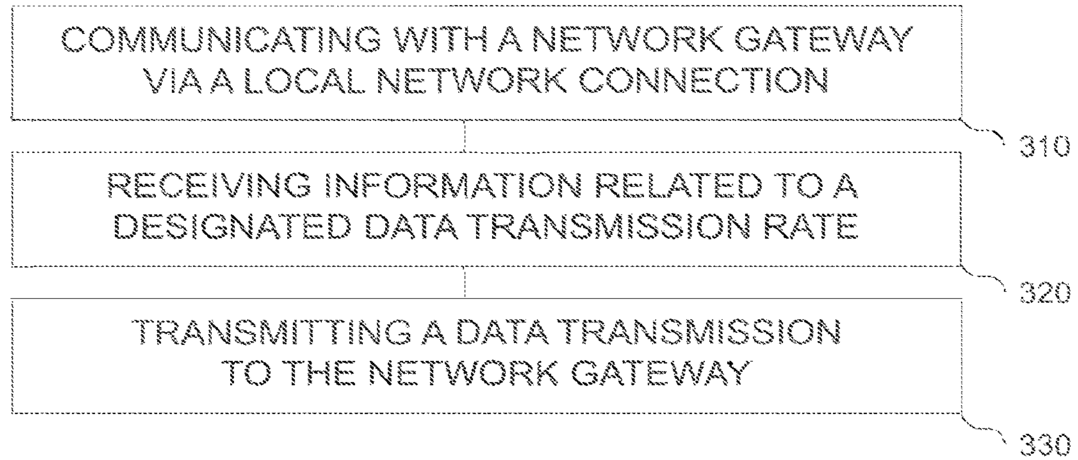
FIG. 4 shows a flow chart of an example of a method for a network entity.

FIG. 4 shows a flow chart of an example of a (corresponding) method for the network entity 300. The method comprises communicating 310 with a network gateway 100 (e.g. the network gateway apparatus 10 of FIG. 1) via a local network connection. The method further comprises receiving 320 information related to a designated data transmission rate for a wireless link from the network gateway via the local network connection. The method further comprises transmitting 330 a data transmission to the network gateway 100 via the local network connection based on the information related to the designated data transmission rate for the wireless link.

The at least one interface 32 is configured to communicate with the network gateway 100 via a local network connection, e.g. via wireless local network connection (e.g. WLAN) or via wired local network connection (e.g. Ethernet).

In at least some examples, the information related to the designated data transmission rate may be implemented similar to the information related to the designated data transmission rate introduced in connection with FIGS. 1 and 2. The control module 34 may be configured to receive the information related to the designated data transmission rate as separate control message from the network gateway, e.g. as periodic or event-based control message. Alternatively, the control module 34 may be configured to receive the information related to the designated data transmission rate as part of a further control message, e.g. as part of a wireless scheduling message, or as part of a dynamic IP-address assignment message.

In various examples, the control module 34 may be configured to control the data transmission to the network gateway 100 on an operating system layer (e.g. on a transport layer of the Open Systems Interconnection (OSI) model) based on the information related to the designated data transmission rate. For example, the control module 34 may be configured to control one or more elements of the group of a communication protocol (e.g. TCP, UDP (User Datagram Protocol) or QUIC (Quick UDP Internet Connections)) of the data transmission, a window size of a communication protocol of the data transmission (e.g. a TCP window size), and a bit rate of the data transmission (e.g. by throttling the data transmission) on an operating system layer based on the information related to the designated data transmission.

Alternatively or additionally, the control module 34 may be configured to control the data transmission to the network gateway 100 on an application layer (e.g. of the OSI model) based on the information related to the designated data transmission rate. For example, the control module 34 may be configured to control one or more elements of the group of a communication protocol (e.g. TCP, UDP or QUIC) of the data transmission, a window size of a communication protocol of the data transmission (e.g. a TCP window size), a bit rate of the data transmission (e.g. by adapting a bit rate of content of the data transmission), and a content of the data transmission (e.g. a bit rate or quality of the content) on an application layer based on the information related to the designated data transmission.

The at least one interface 32 may correspond to one or more inputs and/or outputs for receiving and/or transmitting information, which may be in digital (bit) values according to a specified code, within a module, between modules or between modules of different entities.

In examples, the control module 14 may be implemented using one or more processing units, one or more processing devices, any means for processing, such as a processor, a computer or a programmable hardware component being operable with accordingly adapted software. In other words, the described function of the control module 34 may as well be implemented in software, which is then executed on one or more programmable hardware components. Such hardware components may comprise a general purpose processor, a Digital Signal Processor (DSP), a micro-controller, etc.

More details and aspects of the apparatus 30, device 30, network entity 300 and method are mentioned in connection with the proposed concept or one or more examples described above or below (e.g. FIGS. 1 to 2 and 5 to 7). The apparatus 30, device 30, network entity 300 and method may comprise one or more additional optional features corresponding to one or more aspects of the proposed concept or one or more examples described above or below.

At least some examples describe a method for handling Quality of Service in 5G based Fixed Wireless home routers, e.g. by not just using static configurations of priority queues in the device but by utilizing a framework which may take multiple parameters into account and allows for optimal user experience.

In some systems, 4G/LTE may be used for broadband connectivity. For example, fixed wireless access with a typical 4G network may include either a 1-box or 2-box approach. In a single box approach, the 4G modem may be attached directly to the main Gateway/Router in the house thus serving all the users like a DSL or Ethernet or PON (Passive Optical Network) WAN (Wide Area Network) connection. In 2-box approach, the 4G modem may be attached to a small router or CPE (Customer Premises Equipment) which in turn gets connected to the main Router/Gateway either using an Ethernet link or a Wireless backhaul.

The better configuration for a user (whether 2-box or 1-box) may be decided based on the signal reception characteristics for the user in their home/office. If the signal strength is strong enough in the location where the main router is placed, then a single box approach may be used. If not, a 2-box approach with an additional LTE/4G modem may be used.

Figure 5:
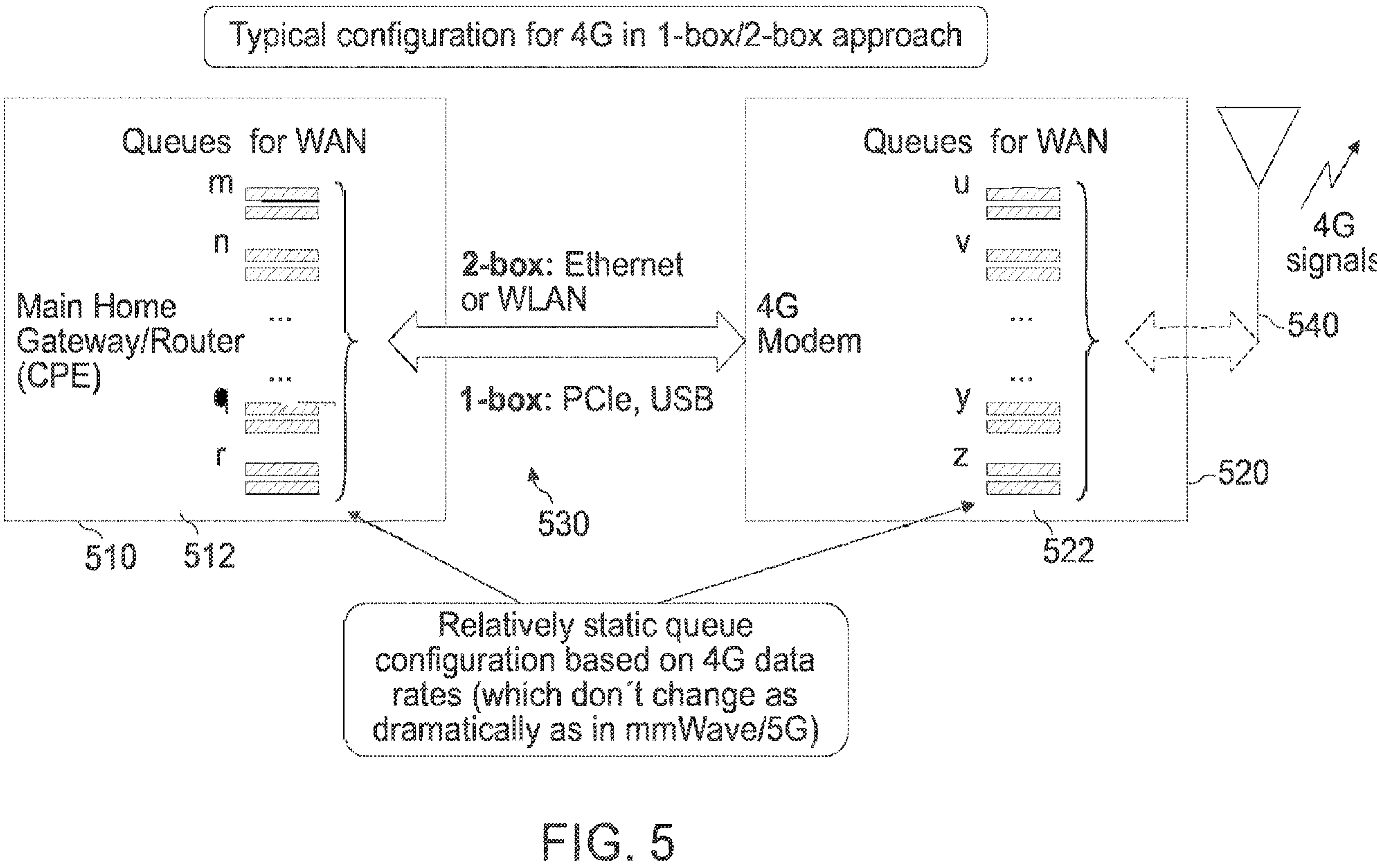
FIG. 5 shows a schematic overview of a system with a home gateway/router and a 4G modem.

FIG. 5 shows a typical scenario for a 1-box/2-box deployment with a 4G modem. A main home gateway/router (CPE) 510 with queues for WAN m-r (Wide Area Network) 512 is connected 530 to a 4G modem 520 either via Ethernet or WLAN (Wireless Local Area Network in a 2-box solution, or via PCIe (Peripheral Component Interconnect express) or USB (Universal Serial Bus) in a 1-box solution. The 4G modem 520 comprises queues for WAN u-z 522, and is coupled to an antenna 540 for transmitting and receiving 4G signals. Relatively static queue configurations may be used for queues 512, 522 based on 4G data rates, which might not change as dramatically as in mmWave/5G).

In a 4G scenario, the link bandwidth variations may be low and the queues on the CPE may be re-adjusted to the data rates of the 4G modem Wireless link on a need basis. Even if the dynamic link rate is not shared in a closed loop to the CPE, the user traffic may usually work fine as the applications discover the link rate and try to adapt to that rate—which might not change too often.

In both the approaches (single box or 2-box) based on an LTE/4G network, the link rate might not vary as drastically as in the case of 5G network because of two reasons:

a) The data rates offered by 4G are lower than 5G (by a magnitude of 10-100 times).

b) 4G uses sub-6 GHz band, which suffers from much less attenuation compared to mm Wave (28 GHz-60 GHz). Hence solutions proposed in 4G fixed wireless access might not be as effective for 5G Example 1. In a typical deployment configuration in 4G network for fixed wireless access, a high priority queue in the main Gateway/Router may be mapped into a high priority queue on the 4G modem. The same may be true with the other queues like Low & Medium priority queues.

2. Based on the LTE link rates, the queue characteristics (like port shaping) might be shaped based on the rates perceived at the head-end of the 4G box. Typically, this configuration may also remain static as the link rate doesn't vary too much 5G-Networks may also be used in a 2-box approach in order to reduce the effect of environmental changes. A 2-box approach with an indoor and outdoor unit (with 5G modem) might be a practical solution to avoid the increased signal attenuation of 5G. In this approach, either a Wireless or Wireline backhaul may be used between the indoor and the outdoor box.

In the case of 5G, reconfiguring queues on a frequent basis may cause poor application performance as the applications based on TCP may struggle to find the right bandwidth characteristics to deliver a stable data rate with a minimum RTT (Round Trip Time).

If 5G is used with a two box approach in order to reduce the effect of environmental changes, the effects of attenuation (which may lead to varying bandwidths) and how an improved user experience could be provided when the link bandwidth is varying significantly might not be addressed. Also, in the case of 5G, a 2-box solution may be unavoidable for the mmWave frequencies as the 5G signal attenuation might be too high and might not reach the main living areas of a house/establishment where the primary router may be placed. Since these two boxes may be connected using either an Ethernet link or a wireless backhaul, there may also be a need for a more effective communication of the link characteristics as seen by the head-end of the 5G modem (which may typically be placed either outside the house in the open or just inside the house near a window where the signal strength is good).

Alternatively or additionally, highly directive antennas in a line-of-sight topology may be used to address the attenuation of mmWave wireless connections. Highly directive antennas in a line of sight topology may be an approach to address the attenuation problems, and may achieve a better link bandwidth. Using highly directive antennas in a line-of-sight topology to address the attenuation of mmWave might not be suited for residential access with huge number of subscribers.

A first key aspect of examples may be to calculate the expected bandwidth (e.g. the designated data transmission rate) of the 5G Modem based on attenuation of the 5G link and the weather. The attenuation and weather may be factored by weighting factors w1, w2, to remove transients, that is temporary events, such as a truck passing affecting the attenuation, whereas a misreading of weather instruments, for example, would affect the weather factor, for the purpose of determining the most reasonable bandwidth. The weighting factors may be determined on a location basis of where the outdoor unit is located.

A second key aspect of at least some examples may be that protocol settings may be sent (e.g. the information related to the designated data transmission rate) from the QoS decision engine (e.g. of the network gateway apparatus 10 of FIG. 1) to client applications and/or devices (e.g. the apparatus 30 and/or the network entity 300 of FIG. 3), and those client applications and/or devices may modify their behavior to take into account the protocol settings, such as TCP Window Size, TCP algorithm, or even adaptability of bit rate, etc. The client applications and/or devices may modify their behavior (e.g. by transmitting the data transmission to the network gateway apparatus based on the information related to the designated data transmission rate), for example, by changing the bit rate of the data stream or video stream of that application or device, changing the traffic characteristics such as business and/or decreasing the queue lengths of the application or device, to accommodate latency.

Therefore, the proposed apparatuses/methods may provide an effective way of understanding, estimating and adapting the QoS in a fixed wireless router solution for the variations in 5G link bandwidth rates. This may be achieved:

- By giving feedback to applications or Devices to adapt to the link characteristics (e.g. choosing a better TCP algorithm to make the RTT or scaling window suite better to the link characteristics)
- or by proactively adjusting QoS parameters such as peak rate, . . . .
- or by temporarily pausing transmission of background services . . . .
- The proposed apparatuses/methods may improve the over-all access system performance
  - By making a better estimate of available bandwidth
  - By giving an improved user/application experience (both real-time and non-real time applications) instead of optimizing bandwidth utilization
  - By having a closed feedback loop with the applications as well as with the RAN (Radio Access Network)
- Using the proposed apparatuses/methods, the Quality of Service may be dynamically adjusted (across the 1-box and 2-box 5G router) without user intervention when the 5G physical rate fluctuates In the case of 5G, it may be difficult to employ two different boxes (or even a single box) with no explicit communication about the link rate variations as it may result in a bad user experience (as the applications struggle to find a stable convergence point). Examples may provide a framework, which may enable explicit communication of multiple parameters as seen by the 5G modem along with other parameters, which may be derived/used by the Router/QoS engine before setting up the queues.

Figures 1, 6:
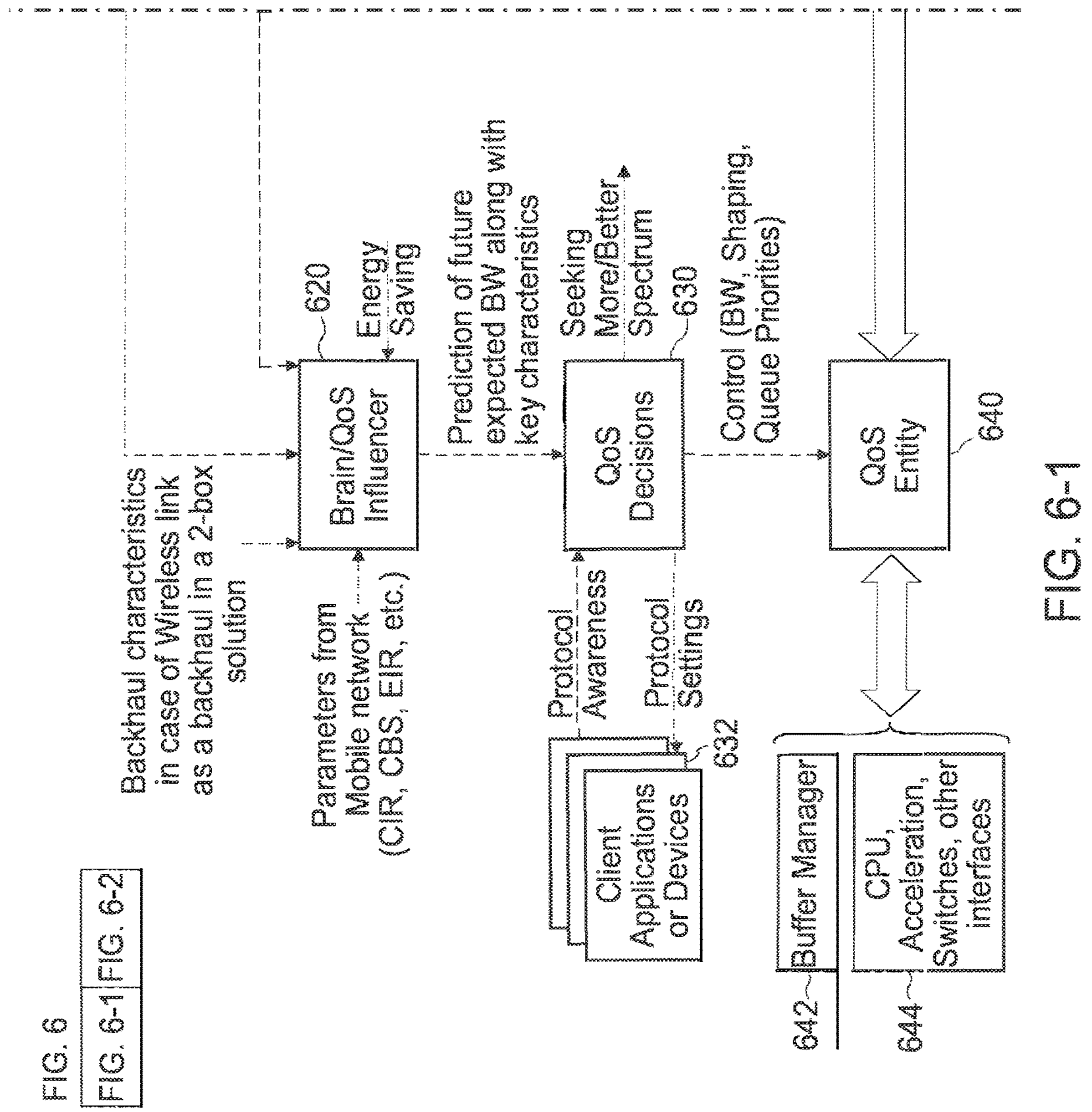
FIG. 6 is comprised of FIGS. 6-1 and 6-2 combined which shows a schematic illustration of a method for handling Quality of Service in a 1-box or in a 2-box approach.
Figures 2, 6:
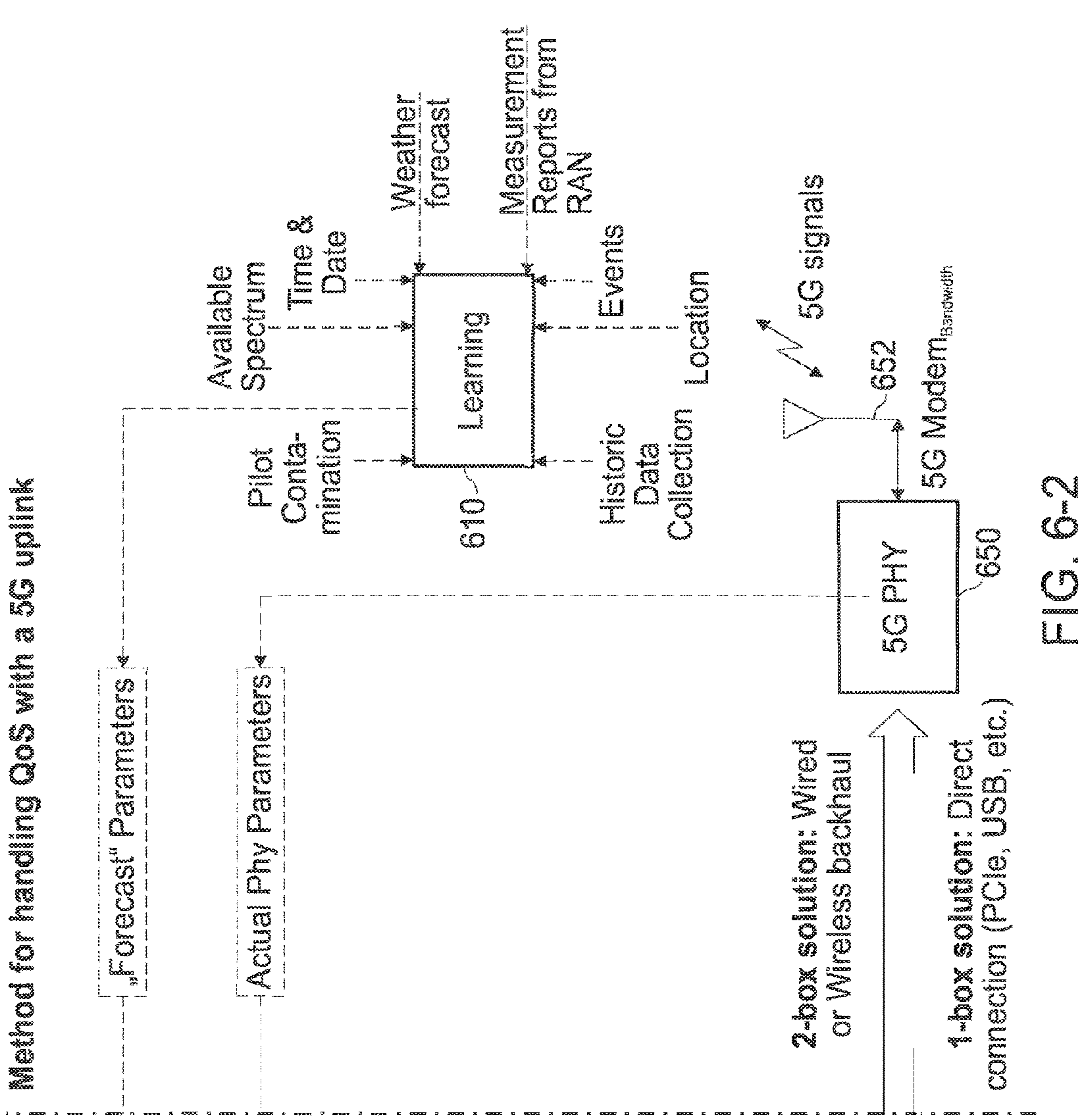

Examples provide a QoS approach for 5G based Fixed Wireless access. FIG. 6 may illustrate the proposed method for handling QoS in both 1-box and 2-box approaches. FIG. 6 shows an example of a typical scenario for a 1-box or 2-box deployment with a 5G modem. FIG. 6 shows the blocks Learning 610, Brain/QoS Influencer 620, QoS Decisions 630, QoS Entity 640 and 5G PHY (derived from Physical layer) 650. The Learning 610 block may receive information on pilot contamination, available spectrum, time & date, weather forecast, measurement reports from RAN, events, location and historic data collection (e.g. the one or more environmental factors), and may provide forecast parameters 612 to the Brain/QoS Influencer 620. The Brain QoS Influencer 620 block may further receive information on backhaul characteristics in the case of a wireless link as a backhaul in a 2-box solution, information on parameters from the mobile network (e.g. Committed Information Rate, Committed Burst Size, Excess Information Rate etc.), information on energy saving, and/or, from the 5G PHY 650 block, information on actual PHY parameters 612 (e.g. the information related to the instantaneous data transmission capacity of the wireless link). The Brain/QoS Influencer 620 block may provide a prediction of the future expected bandwidth (e.g. the designated data transmission rate) along with key characteristics (e.g. the information related to the designated data transmission rate) to the QoS Decisions block 630. The QoS decisions block 630 may receive information on a protocol awareness from client applications or devices 632, and transmit protocol settings to the client applications or devices 632. The QoS decisions block 630 may further seek more or better spectrum, and may control (a bandwidth, shaping or queue priorities of the) QoS Entity 640. The QoS Entity may be coupled to a buffer manager 642 and to a CPU (Central Processing Unit), Acceleration, Switches, other Interfaces block 644. The QoS Entity 640 is coupled to the 5G PHY 650, e.g. via a wired or wireless backhaul in 2-box solution or via direct connection (PCIe, USB etc.) in a 1-box solution. The 5G PHY 650 is coupled to an antenna 652 used for transmitting and receiving 5G signals to achieve the 5G modem bandwidth.

The "Learning" block 610 (e.g. the control module 14 configured to perform the learning function) may be a key block which may take various inputs (time & date, location, weather forecast, historic data, pilot contamination, measurement reports, Events, Available Spectrum etc., e.g. the information related to the one or more environmental factors) into consideration and may give out "Forecast" on key parameters like "attenuation", "estimated bandwidth" etc. as an input to the "Brain/QoS influencer". Rain (Rain drop size distribution) and frequency may be considered important factors (e.g. of the information related to the one or more environmental factors) influencing "attenuation" in equatorial climate, hence weather forecast may be a critical input. Similarly, "tree crowns" may influence the attenuation and hence Location (e.g. the information related to the location of the wireless modem circuit and/or the information related to the location of the base station transceiver) may be another input to the learning block. The "Learning" block 610 may use various techniques like Machine Learning/Artificial Intelligence (e.g. the learning function) to predict/forecast the parameters (e.g. the information related to the expected attenuation on the wireless link). Some possible learning algorithms are: RNN (Recurrent Neural Network), CNN (Convolutional Neural Network) & RNN-CNN etc. The forecasted parameters (e.g. the information related to the expected attenuation on the wireless link) may form a critical input for the "Brain/QoS engine" (620) to enable it not only basing its decisions on the current PHY parameters (e.g. the information related to the instantaneous data transmission capacity of the wireless link) but using a wider set of inputs and makes an improved decision in terms of providing "an improved or optimal user-experience"

The Brain/QoS influencer block 620 may take inputs of "Forecast" parameters from the "Learning" block, "Backhaul link characteristics" in case of Wireless link in 2-box approach, "actual PHY parameters" and may optionally add intelligence like "Parameters from the Mobile Network (CIR, CBS, EIR etc.)", "Energy Saving" parameters and may provide

- Prediction for the "Expected Bandwidth along with key characteristics" (e.g. the information related to the designated data transmission rate) which may be required for QoS decisions.
- Inputs to the "QoS decisions" block 630 on what could be the improved/optimal traffic patterns by looking at the holistic picture
- Input to the "QoS decisions" block 630 on the improved/optimal traffic scheduling between 5G and 4G in NSA (non-standalone) mode The "QoS decisions" block 630 may take inputs from the "Brain/QoS influencer" and may add "Protocol awareness" & "Protocol Settings" on top to generate the set of actions, final QoS rules (e.g. the information related to the designated data transmission rate), which may then be configured in the "QoS entity" 640 or communicated to the RAN (Radio Access Network).

Protocol Awareness:

Based on the "protocol/data characteristics" of the device as an input, the "QoS Decisions" 630 block may (e.g. by transmitting the control signal to the wireless modem circuit 200)

- "seek for more spectrum allocation" and/or
- "switching to 4G for reliable spectrum" and/or
- "look for special low latency spectrum" and/or
- Sense the presence of 5G Wi-Fi in the case of LAA (License Assisted Access) bands and intimating it to RAN Protocol Settings:

The "QoS decisions" block 630 may signal (e.g. by transmitting the information related to the designated data transmission rate) key protocols or applications (e.g. the network entity 300) to adapt their protocols (e.g. to transmit the data transmission) to suite to the "prediction" as seen by the "QoS decisions" block. Some examples of this are:

- The Device/application changing to a different transport algorithm (TCP (Transmission Control Protocol), UDP (User Datagram Protocol), QUIC (Quick UDP Internet Connections) etc.) to suite to the suggested 5G link characteristics
- An application/device changing the TCP Window size
- An application changing the bit-rate appropriate to the link characteristics
- Pass the characteristics of the link and let the application decide on best way to adapt The-QoS entity" 640 may get/obtain the QoS configuration from the-QoS decisions" block 630 and may interact with units like CPU, Buffer Manager acceleration etc. (642, 644) to implement the suggested QoS configuration for the device. The output of "QoS entity" may be traffic going onto the 5G link with the required QoS effects (Shaping, Prioritization etc.)

Possible Usages of the Above Framework:

Example #A: Use Only Actual 5G PHY Parameters

In the simplest type of implementation, only the actual 5G PHY parameter "actual data-rate" (e.g. the information related to the instantaneous data transmission capacity of the wireless link) might be evaluated by the "Brain" (e.g. by the control module 14) and translated into a QoS rule (e.g. the information related to the designated data transmission rate) that may represent a smoothened version of the wireless rate. The smoothening parameters may be chosen such that 1. intermittent rate drops (e.g. within the instantaneous data transmission capacity) in the range of several milliseconds might not be translated into QoS rule-changes (e.g. for the designated data transmission rate, may be covered by TCP retransmission)
2. sufficient margin between 5G actual rate and advertised QoS rate (e.g. the information related to the designated data transmission rate) may be provisioned (to deal with immediate rate drops)
3. a slow time constant (e.g. update rate) of several 10th of seconds (or even minutes) may be used to follow the average 5G rate.

Example #B: Use Forecast (e.g. the Information Related to the One or More Environmental Factors Related to the Wireless Link of the Wireless Modem Circuit) & Actual PHY Parameters (e.g. the Information Related to the Instantaneous Data Transmission Capacity of the Wireless Link) for "Actual Bandwidth" (e.g. for the Information Related to the Designated Data Transmission Rate) Calculation Actual Phy Parameter—Attenuation Factor (u):

Attenuation Factor (u) may be a typical variation of attenuation which may be considered as normal on a 5G modem under a given deployment scenario. In the above framework, this may be derived from "Actual Phy Parameters". Example usage: On a physical link bandwidth of 1 Gbps (gigabit per second), a variation of 20% may be considered normal/acceptable. The attenuation factor in this case may be 0.2. This attenuation factor (u) when considered in the CPE/Gateway bandwidth calculations (e.g. for the information related to the designated data transmission rate) may help in avoiding a "see-saw effect".

Forecast Phy Parameter—Weather Prediction Factor (k) (e.g. the Environmental Prediction Factor): A weather prediction factor (k) would be the influencing factor based on the weather conditions. Weather conditions may play a major role in the mm Wave attenuation and hence if taken into account may help in arriving at a more "realistic" bandwidth for the CPE. This factor is reflected as "Forecast Parameters" (e.g. the information related the environmental factors of the wireless link) in the above framework.

There are several prediction models for calculating mm Wave attenuation under different weather conditions. The CPE/Gateway or even the 5G modem may theoretically obtain this factor either directly or calculate it on their own based on the weather forecast for the day/time using appropriate "Machine Learning Algorithms". Example Usage: On a given day and time, the weather prediction factor (k) could be 0 in case of a dry day/time OR 0.3 in the case of a rainy day/time.

Formula for Calculating Effective Bandwidth:

5GModem Bandwidth=5G Physical Link Bandwidth (e.g. the instantaneous data transmission capacity)

Gateway Router Bandwidth=5GModem Bandwidth*$(1-k)$*$(1-u)$

Feedback from the 5G Modem on attenuation factor (u) (e.g. comprised in the information related to the instantaneous data transmission capacity of the wireless link) may be taken into account either on a periodic basis or once the threshold ($u_{min}$, $u_{max}$) is violated i.e. "u" should be communicated to CPE/Gatway/Router if it is not in the range of "$u_{min}$<=u<=$u_{max}$)

Example Scenarios:

For a given deployment with $u_{min}$ of 0.1 and $u_{max}$ of 0.2 (which means 10-20% variation in link bandwidth for this deployment is normal) on a sunny day k=0 (which effectively means there is no additional attenuation which might be considered)

Gateway Router Bandwidth=5G Modem Bandwidth*(1−0)*(1−0.2)=5G Modem Bandwidth*0.8

Effectively this would mean, CPE/Gateway might only be using 80% of the overall physical link bandwidth unless the attenuation (u) changes beyond 20% or falls below 10%

Alternately based on the prediction models, weightages could also be added to the factors under discussion as below.

Example for Assigning Weights:

Gateway Router Bandwidth=5GModem Bandwidth*$w_1$*(1−k)*$w_2$*(1−u) where $w_1$ and $w_2$ are weights with values between 0.1 and 1.

Taking both the "attenuation factor (actual PHY parameters)" and the "weather factor (Forecast parameters)" into account may lead to a "conservative" utilization of bandwidth but still lead to a good user-experience.

All the above concepts around "attenuation factor (u)" and "weather factors (k)" could be employed for a single box as well as 2-box solution.

Figure 7:
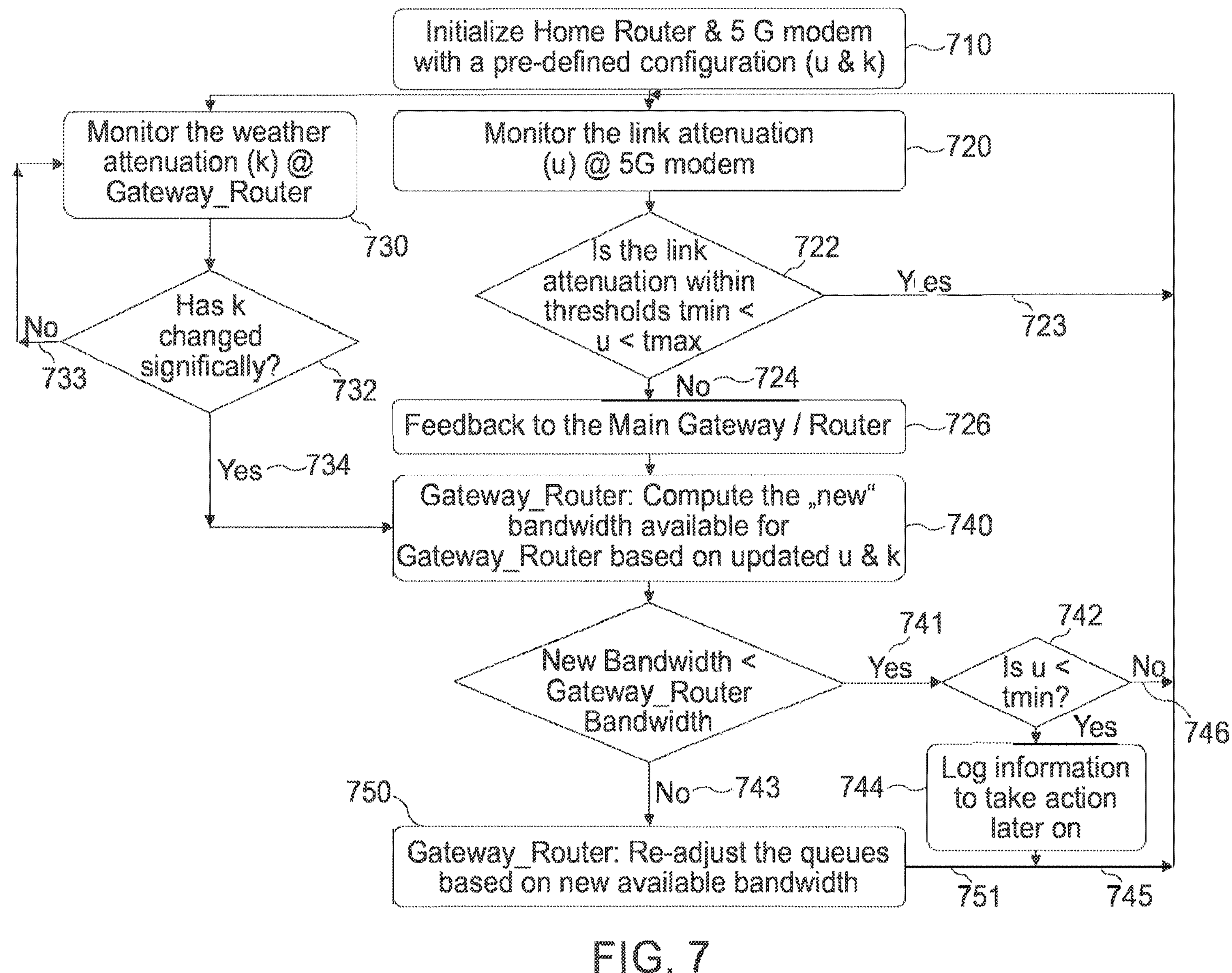
FIG. 7 shows a simplified flow diagram for an exemplary communication between Gateway/Customer Premises Equipment and 5G Modem in 5G Fixed Wireless with just "attenuation factor" and "weather factor" as parameters.

FIG. 7 shows a simplified flow diagram for an exemplary communication between Gateway/CPE and 5G Modem in 5G Fixed Wireless with just "attenuation factor" and "weather factor" as parameters. The home router and SG modem may be initialized with a pre-defined configuration (u&k) 710. Both the link attenuation (u) at the 5G modem 720 and the weather attenuation (k) at the gateway-router 730 may be monitored. If the link attenuation is within thresholds $t_{min}$<u<$t_{max}$ 722, the monitoring of the link attenuation 720 and the monitoring of the weather attenuation 730 may be continued 723. If not 724, feedback may be given to the main gateway/router 726. If k has not changed significantly 732, the monitoring of the weather attenuation 730 may be continued 733, if it has changed significantly 732, the change may be reported 734. The Gateway_Router may compute 740 the "new" bandwidth available for the Gateway_Router based on the feedback given 724 to the Gateway_Router and/or based on the reported 734 significant change in the weather attenuation. If the new bandwidth is smaller than the Gateway_Router bandwidth 741 and u is smaller than tmin 742, the information may be logged to take action later on 744 and the monitoring of the link attenuation 720 and the monitoring of the weather attenuation 730 may be continued 745. If the new bandwidth is smaller than the Gateway_Router bandwidth 741 and u is not smaller than tmin 742, the monitoring of the link attenuation 720 and the monitoring of the weather attenuation 730 may be continued 746. If the new bandwidth is not smaller than the Gateway_Router bandwidth 743, the Gateway_Router may re-adjust the queues based on the new available bandwidth 750 and the monitoring of the link attenuation 720 and the monitoring of the weather attenuation 730 may be continued 751.

Many Different Scenarios could be Achieved with the Above Framework:

- Improving user experience by being conservative on the link bandwidth estimation (as most applications are TCP and being conservative with a threshold may help more than being aggressive with the 5G link utilization)
- Improve the bandwidth utilization for a specific application by setting the right QoS parameters after considering the inputs from the "QoS influencer"
- Allow an application/device to change its TCP or UDP characteristics by feeding back info from the "QoS Decisions" engine in order to get the desired results
- Feedback to RAN (Radio Access Network) based on the traffic patterns and application needs The above are only a few examples, but the method above is not limited to them. Using the above method, a 5G Fixed Wireless Access router (1-box and 2-box) may intelligently decide and handle the 5G link bandwidth variations effectively.

Example 1 relates to a network gateway apparatus 10 for determining information related to a designated data transmission rate for a wireless link. The apparatus 10 comprises at least one interface 12 for communicating with a wireless modem circuit 200. The apparatus 10 comprises a control module 14 configured to obtain information related to an instantaneous data transmission capacity of the wireless link via the at least one interface 12. The control module 14 is configured to determine the information related to the designated data transmission rate based on the information related to the instantaneous data transmission capacity of the wireless link. The designated data transmission rate is lower than an average data transmission capacity of the wireless link. An availability of the designated data transmission rate over the wireless link is higher than an availability of the average data transmission capacity over the wireless link.

Example 2 may include the subject matter of example 1, wherein the information related to the designated data transmission rate indicates an estimated data rate over the wireless link, at which retransmissions due to the fluctuations in a data transmission capacity of the wireless link are less frequent compared with data transmission over the wireless link at a higher data rate.

Example 3 may include the subject matter of one of the previous examples, wherein the data transmission capacity of the wireless link fluctuates over time due to changes in an attenuation of the wireless link, wherein the control module 14 is configured to determine information related to an extent of the fluctuation due to the changes in attenuation of the wireless link based on the information related to the instantaneous data transmission capacity of the wireless link, wherein the control module 14 is configured to determine the information related to the designated data transmission rate based on the information related to the extent of the fluctuation due to the changes in attenuation of the wireless link.

Example 4 may include the subject matter of example 3, wherein the control module 14 is configured to determine information related to an attenuation factor based on the information related to the extent of the fluctuation due to the changes in attenuation of the wireless link, wherein the control module 14 is configured to determine the information related to the designated data transmission rate based on a maximal data transmission capacity of the wireless link and based on the information related to the attenuation factor.

Example 5 may include the subject matter of one of the previous examples, wherein the information related to the instantaneous data transmission capacity of the wireless link comprises information related to one or more environmental factors related to the wireless link of the wireless modem circuit 200, wherein the control module 14 is further configured to determine the information related to the designated data transmission rate based on the information related to the one or more environmental factors.

Example 6 may include the subject matter of example 5, wherein the control module 14 is configured to determine information related to an expected attenuation on the wireless link based on the information related to the one or more environmental factors.

Example 7 may include the subject matter of example 6, wherein the control module 14 is configured to determine information related to an attenuation factor based on the information related to the expected attenuation on the wireless link.

Example 8 may include the subject matter of one of the examples 5 to 7, wherein the control module 14 is configured to determine the information related to the expected attenuation on the wireless link based on the information related to the one or more environmental factors and based on a learning function, wherein the learning function is based on previous information related to the one or more environmental factors related to the wireless link.

Example 9 may include the subject matter of example 8, wherein the learning function is based on a machine learning algorithm, and/or wherein the learning function is based on a recurrent neural network, and/or wherein the learning function is based on a convolutional neural network.

Example 10 may include the subject matter of one of the examples 5 to 9, wherein the information related the environmental factors of the wireless link comprises one or more elements of the group of information related to an attenuation of the wireless link, weather information, information related to a location of the wireless modem circuit 200, and information related to a location of a base station transceiver associated with the wireless link.

Example 11 may include the subject matter of one of the previous examples, wherein the control module 14 is configured to determine the information related to the designated data transmission rate based on one or more data transmission parameters of the wireless link.

Example 12 may include the subject matter of one of the previous examples, wherein the control module 14 is configured to determine the information related to the designated data transmission rate based on a desired energy profile for the wireless modem circuitry 200.

Example 13 may include the subject matter of one of the previous examples, wherein the control module 14 is further configured to provide a data transmission to the wireless modem circuit 200 for transmission via the wireless link based on the information related to the designated data transmission rate.

Example 14 may include the subject matter of example 13, wherein the at least one interface 12 is further configured to communicate with a network entity 300 via a local network connection, wherein the control module 14 is configured to provide the information related to the designated data transmission rate to the network entity 300, wherein the control module 14 is configured to receive the data transmission from the network entity 300 based on the information related to the designated data transmission rate to the network entity.

Example 15 may include the subject matter of one of the examples 13 or 14, wherein the control module 14 is configured to control traffic shaping and/or a prioritization of the data transmission based on the information related to the designated data transmission rate.

Example 16 may include the subject matter of one of the previous examples, wherein the control module 14 is configured to repeat determining the information related to the designated data transmission rate based on an update rate for the designated data transmission rate, wherein the update rate for the designated data transmission rate is at least 8 times lower than an update rate of the information related to an instantaneous data transmission capacity, or wherein the update rate for the designated data transmission rate is at most once every ten seconds.

Example 17 may include the subject matter of one of the previous examples, wherein the control module 14 is configured to transmit a control signal to the wireless modem circuit based on the information related to the designated data transmission rate, wherein the control module 14 is configured to affect a wireless resources usage of the wireless modem for the wireless link and/or a wireless technology usage of the wireless modem circuit 200 for the wireless link using the control signal.

Example 18 may include the subject matter of one of the previous examples, wherein the wireless modem circuit 200 is a wireless modem circuit for a 5th generation cellular mobile communication network, and/or wherein the wireless link is based on a 5th generation cellular mobile communication network.

Example 19 may include the subject matter of one of the previous examples, wherein the wireless modem circuit 200 is a wireless modem circuit for a millimeter wave-based mobile communication network, and/or wherein the wireless link is a millimeter wave-based wireless link.

Example 20 may include the subject matter of one of the previous examples, wherein a data transmission capacity of the wireless link fluctuates over time.

Example 21 relates to an apparatus 30 for a network entity 300. The apparatus 30 comprises at least one interface 32 configured to communicate with a network gateway 100 via a local network connection. The apparatus 30 further comprises a control module 34 configured to receive information related to a designated data transmission rate for a wireless link from the network gateway 100 via the at least one interface 32. The control module 34 is configured to transmit a data transmission to the network gateway 100 via the at least one interface 32 based on the information related to the designated data transmission rate for the wireless link.

Example 22 may include the subject matter of example 21, wherein the control module 34 is configured to control one or more elements of the group of a communication protocol of the data transmission, a window size of a communication protocol of the data transmission, a bit rate of the data transmission and a content of the data transmission based on the information related to the designated data transmission rate.

Example 23 relates to a network gateway 100 comprising the network gateway apparatus according to one of the examples 1 to 20.

Example 24 may include the subject matter of example 23, wherein the network gateway 100 further comprises the wireless modem circuitry 200.

Example 25 may include the subject matter of one of the examples 23 or 24, wherein the network gateway 100 is a mobile network gateway 100.

Example 26 relates to a network entity 300 comprising the apparatus 30 according to one of the examples 21 or 22.

Example 27 relates to a mobile device 300 comprising the apparatus 30 according to one of the examples 21 or 22.

Example 28 relates to a network gateway device 10 for determining information related to a designated data transmission rate for a wireless link. The device 10 comprises at least one means for communicating 12 for communicating with a wireless modem means 200. The device 10 further comprises a means for controlling 14 configured for obtaining information related to an instantaneous data transmission capacity of the wireless link via the at least one means for communicating 12. The means for controlling 14 is further configured for determining the information related to the designated data transmission rate based on the information related to the instantaneous data transmission capacity of the wireless link. The designated data transmission rate is lower than an average data transmission capacity of the wireless link, and wherein an availability of the designated data transmission rate over the wireless link is higher than an availability of the average data transmission capacity over the wireless link.

Example 29 may include the subject matter of example 28, wherein the information related to the designated data transmission rate indicates an estimated data rate over the wireless link, at which retransmissions due to the fluctuations in a data transmission capacity of the wireless link are less frequent compared with data transmission over the wireless link at a higher data rate.

Example 30 may include the subject matter of one of the examples 28 or 29, wherein the data transmission capacity of the wireless link fluctuates over time due to changes in an attenuation of the wireless link, wherein the means for controlling 14 is configured for determining information related to an extent of the fluctuation due to the changes in attenuation of the wireless link based on the information related to the instantaneous data transmission capacity of the wireless link, wherein the means for controlling 14 is configured for determining the information related to the designated data transmission rate based on the information related to the extent of the fluctuation due to the changes in attenuation of the wireless link.

Example 31 may include the subject matter of example 30, wherein the means for controlling 14 is configured for determining information related to an attenuation factor based on the information related to the extent of the fluctuation due to the changes in attenuation of the wireless link, wherein the means for controlling 14 is configured for determining the information related to the designated data transmission rate based on a maximal data transmission capacity of the wireless link and based on the information related to the attenuation factor.

Example 32 may include the subject matter of one of the examples 28 to 31, wherein the information related to the instantaneous data transmission capacity of the wireless link comprises information related to one or more environmental factors related to the wireless link of the wireless modem means 200, wherein the means for controlling 14 is further configured for determining the information related to the designated data transmission rate based on the information related to the one or more environmental factors.

Example 33 may include the subject matter of example 32, wherein the means for controlling 14 is configured for determining information related to an expected attenuation on the wireless link based on the information related to the one or more environmental factors.

Example 34 may include the subject matter of example 33, wherein the means for controlling 14 is configured for determining information related to an attenuation factor based on the information related to the expected attenuation on the wireless link.

Example 35 may include the subject matter of one of the examples 32 to 34, wherein the means for controlling 14 is configured for determining the information related to the expected attenuation on the wireless link based on the information related to the one or more environmental factors and based on a learning function, wherein the learning function is based on previous information related to the one or more environmental factors related to the wireless link.

Example 36 may include the subject matter of example 35, wherein the learning function is based on a machine learning algorithm, and/or wherein the learning function is based on a recurrent neural network, and/or wherein the learning function is based on a convolutional neural network.

Example 37 may include the subject matter of one of the examples 32 to 36, wherein the information related the environmental factors of the wireless link comprises one or more elements of the group of information related to an attenuation of the wireless link, weather information, information related to a location of the wireless modem means 200, and information related to a location of a base station transceiver associated with the wireless link.

Example 38 may include the subject matter of one of the examples 28 to 37 wherein the means for controlling 14 is configured for determining the information related to the designated data transmission rate based on one or more data transmission parameters of the wireless link.

Example 39 may include the subject matter of one of the examples 28 to 38, wherein the means for controlling 14 is configured for determining the information related to the designated data transmission rate based on a desired energy profile for the wireless modem means 200.

Example 40 may include the subject matter of one of the examples 28 to 39, wherein the means for controlling 14 is further configured for providing a data transmission to the wireless modem means 200 for transmission via the wireless link based on the information related to the designated data transmission rate.

Example 41 may include the subject matter of example 40, wherein the at least one means for communicating 12 is further configured for communicating with a network entity 300 via a local network connection, wherein the means for controlling 14 is configured for providing the information related to the designated data transmission rate to the network entity 300, wherein the means for controlling 14 is configured for receiving the data transmission from the network entity 300 based on the information related to the designated data transmission rate to the network entity.

Example 42 may include the subject matter of one of the examples 40 or 41, wherein the means for controlling 14 is configured for controlling traffic shaping and/or a prioritization of the data transmission based on the information related to the designated data transmission rate.

Example 43 may include the subject matter of one of the examples 28 to 42, wherein the means for controlling 14 is configured for repeating determining the information related to the designated data transmission rate based on an update rate for the designated data transmission rate, wherein the update rate for the designated data transmission rate is at least 8 times lower than an update rate of the information related to an instantaneous data transmission capacity, or wherein the update rate for the designated data transmission rate is at most once every ten seconds.

Example 44 may include the subject matter of one of the examples 28 to 43, wherein the means for controlling 14 is configured for transmitting a control signal to the wireless modem means based on the information related to the designated data transmission rate, wherein the means for controlling 14 is configured for affecting a wireless resources usage of the wireless modem for the wireless link and/or a wireless technology usage of the wireless modem means 200 for the wireless link using the control signal.

Example 45 may include the subject matter of one of the examples 38 to 44, wherein the wireless modem means 200 is a wireless modem means for a 5th generation cellular mobile communication network, and/or wherein the wireless link is based on a 5th generation cellular mobile communication network.

Example 46 may include the subject matter of one of the examples 28 to 45, wherein the wireless modem means 200 is a wireless modem means for a millimeter wave-based mobile communication network, and/or wherein the wireless link is a millimeter wave-based wireless link.

Example 47 may include the subject matter of one of the examples 28 to 46, wherein a data transmission capacity of the wireless link fluctuates over time.

Example 48 relates to a device 30 for a network entity 300. The device 30 comprises at least one means for communicating 32 configured for communicating with a network gateway 100 via a local network connection. The device 30 further comprises a means for controlling 34 configured for receiving information related to a designated data transmission rate for a wireless link from the network gateway device 100 via the at least one means for communicating 32. The means for controlling 34 is further configured for transmitting a data transmission to the network gateway 100 via the at least one means for communicating 32 based on the information related to the designated data transmission rate for the wireless link.

Example 49 may include the subject matter of example 48, wherein the means for controlling 34 is configured for controlling one or more elements of the group of a communication protocol of the data transmission, a window size of a communication protocol of the data transmission, a bit rate of the data transmission and a content of the data transmission based on the information related to the designated data transmission rate.

Example 50 relates to a network gateway 100 comprising the network gateway device according to one of the examples 28 to 47.

Example 51 may include the subject matter of example 50 further comprising the wireless modem circuitry 200.

Example 52 may include the subject matter of one of the examples 50 or 51, wherein the network gateway 100 is a mobile network gateway 100.

Example 53 relates to a network entity 300 comprising the device 30 according to one of the examples 48 or 49.

Example 54 relates to a mobile device 300 comprising the device 30 according to one of the examples 48 or 49.

Example 55 relates to a network gateway method for determining information related to a designated data transmission rate for a wireless link. The network gateway method comprises obtaining 110 information related to an instantaneous data transmission capacity of the wireless link from a wireless modem circuitry 200. The network gateway method further comprises determining 120 the information related to the designated data transmission rate based on the information related to the instantaneous data transmission capacity of the wireless link. The designated data transmission rate is lower than an average data transmission capacity of the wireless link. An availability of the designated data transmission rate over the wireless link is higher than an availability of the average data transmission capacity over the wireless link.

Example 56 may include the subject matter of example 55, wherein the information related to the designated data transmission rate indicates an estimated data rate over the wireless link, at which retransmissions due to the fluctuations in a data transmission capacity of the wireless link are less frequent compared with data transmission over the wireless link at a higher data rate.

Example 57 may include the subject matter of one of the examples 55 to 56, wherein the data transmission capacity of the wireless link fluctuates over time due to changes in an attenuation of the wireless link, wherein the method further comprises determining information related to an extent of the fluctuation due to the changes in attenuation of the wireless link based on the information related to the instantaneous data transmission capacity of the wireless link, wherein the information related to the designated data transmission rate is determined based on the information related to the extent of the fluctuation due to the changes in attenuation of the wireless link.

Example 58 may include the subject matter of example 57, wherein the method further comprises determining 130 information related to an attenuation factor based on the information related to the extent of the fluctuation due to the changes in attenuation of the wireless link, wherein the information related to the designated data transmission rate is determined based on a maximal data transmission capacity of the wireless link and based on the information related to the attenuation factor.

Example 59 may include the subject matter of one of the examples 55 to 58, wherein the information related to the instantaneous data transmission capacity of the wireless link comprises information related to one or more environmental factors related to the wireless link of the wireless modem circuitry 200, wherein the information related to the designated data transmission rate is determined based on the information related to the one or more environmental factors.

Example 60 may include the subject matter of example 59, wherein the method further comprises determining information related to an expected attenuation on the wireless link based on the information related to the one or more environmental factors.

Example 61 may include the subject matter of example 60, wherein the method further comprises determining 130 information related to an attenuation factor based on the information related to the expected attenuation on the wireless link.

Example 62 may include the subject matter of one of the examples 59 to 61, wherein the information related to the expected attenuation on the wireless link is determined based on the information related to the one or more environmental factors and based on a learning function, wherein the learning function is based on previous information related to the one or more environmental factors related to the wireless link.

Example 63 may include the subject matter of example 60, wherein the learning function is based on a machine learning algorithm, and/or wherein the learning function is based on a recurrent neural network, and/or wherein the learning function is based on a convolutional neural network.

Example 64 may include the subject matter of one of the examples 59 to 63, wherein the information related the environmental factors of the wireless link comprises one or more elements of the group of information related to an attenuation of the wireless link, weather information, information related to a location of the wireless modem circuitry 200, and information related to a location of a base station transceiver associated with the wireless link.

Example 65 may include the subject matter of one of the examples 59 to 64, wherein the control module 14 is configured to determine the information related to the designated data transmission rate based on one or more data transmission parameters of the wireless link.

Example 66 may include the subject matter of one of the examples 59 to 65, wherein the control module 14 is configured to determine the information related to the designated data transmission rate based on a desired energy profile for the wireless modem circuitry 200.

Example 67 may include the subject matter of one of the examples 55 to 66, wherein the method further comprises providing a data transmission to the wireless modem circuitry 200 for transmission via the wireless link based on the information related to the designated data transmission rate.

Example 68 may include the subject matter of example 67, wherein the method further comprises communicating with a network entity 300 via a local network connection, wherein the method further comprises providing the information related to the designated data transmission rate to the network entity 300, wherein the method further comprises receiving the data transmission from the network entity 300 based on the information related to the designated data transmission rate to the network entity.

Example 69 may include the subject matter of one of the examples 67 or 68, wherein the method further comprises controlling traffic shaping and/or a prioritization of the data transmission based on the information related to the designated data transmission rate.

Example 70 may include the subject matter of one of the examples 55 to 69, wherein the method comprises repeating determining the information related to the designated data transmission rate based on an update rate for the designated data transmission rate, wherein the update rate for the designated data transmission rate is at least 8 times lower than an update rate of the information related to an instantaneous data transmission capacity, or wherein the update rate for the designated data transmission rate is at most once every ten seconds.

Example 71 may include the subject matter of one of the examples 55 to 70, wherein the method further comprises transmitting a control signal to the wireless modem circuitry based on the information related to the designated data transmission rate, wherein the method comprises affecting a wireless resources usage of the wireless modem for the wireless link and/or a wireless technology usage of the wireless modem circuitry 200 for the wireless link using the control signal.

Example 72 may include the subject matter of one of the examples 55 to 71, wherein the wireless modem circuitry 200 is a wireless modem circuitry for a 5th generation cellular mobile communication network, and/or wherein the wireless link is based on a 5th generation cellular mobile communication network.

Example 73 may include the subject matter of one of the examples 55 to 72, wherein the wireless modem circuitry 200 is a wireless modem circuitry for a millimeter wave-based mobile communication network, and/or wherein the wireless link is a millimeter wave-based wireless link.

Example 74 may include the subject matter of one of the examples 55 to 73, wherein a data transmission capacity of the wireless link fluctuates over time.

Example 75 relates to a method for a network entity 300. The method comprises communicating 310 with a network gateway 100 via a local network connection. The method further comprises receiving 320 information related to a designated data transmission rate for a wireless link from the network gateway via the local network connection. The method further comprises transmitting 330 a data transmission to the network gateway via the local network connection based on the information related to the designated data transmission rate for the wireless link.

Example 76 may include the subject matter of example 75, wherein the method further comprises controlling one or more elements of the group of a communication protocol of the data transmission, a window size of a communication protocol of the data transmission, a bit rate of the data transmission and a content of the data transmission based on the information related to the designated data transmission rate.

Example 77 relates to a machine readable storage medium including program code, when executed, to cause a machine to perform the method of one of the examples 55 to 76.

Example 78 relates to a computer program having a program code for performing the method of at least one of the examples 55 to 76, when the computer program is executed on a computer, a processor, or a programmable hardware component.

Example 79 machine readable storage including machine readable instructions, when executed, to implement a method or realize an apparatus as claimed in any pending example.

Example 80 relates to a network gateway or to a network entity performing the method of one of the examples 55 to 76.

Example 81 relates to a system comprising the network gateway 100 according to one of the examples 23 to 25 and the network device 300 according to one of the examples 26 or 27.

Example 82 relates to a system comprising the network gateway 100 according to one of the examples 50 to 52 and the network device 300 according to one of the examples 53 or 54.

Examples provide an apparatus (e.g. the network gateway apparatus 10) for determining a data communication bandwidth (e.g. the designated data transmission rate) for transmission of data (e.g. the data transmission). The apparatus comprises a processor circuit (e.g. the control module 14) configured to determine a data communication bandwidth based on a bandwidth of a wireless communication link (e.g. the information related to the instantaneous data transmission capacity of the wireless link) and at least one of an attenuation information (e.g. the information related to an attenuation of the wireless link) of the wireless communication link and an environmental information of an area of the wireless communication link (e.g. the one or more environmental factors).

In some examples, the bandwidth of a wireless communication link (e.g. the wireless link) is a 5G modem bandwidth being equal to a 5G physical link bandwidth. For examples, the wireless communication link may be a 5G link. For example, the data communication bandwidth may be a gateway/router bandwidth (e.g. the maximal data transmission capacity) equal to the 5G modem bandwidth times $(1-k)$ times $(1-u)$, wherein $u$ is an attenuation factor representing the attenuation information of the wireless communication link and $k$ is a weather prediction factor (e.g. one of the one or more environmental factors) representing the environmental information of the area of the wireless communication link.

In some examples, the environmental information (e.g. the one or more environmental factors) of the area of the wireless communication link is at least one of a weather information, a pollution information, a traffic information and a tree distribution information.

In various examples, the processor circuit is configured to determine the data communication bandwidth further based on at least an attenuation related weighting factor and an environmental related weighting factor.

In at least some examples, the apparatus (e.g. the processor circuit) is configured to determine a QoS protocol (e.g. to control the data transmission) based on the determined data communication bandwidth. The apparatus may be configured to trigger a transmission of a QoS protocol information (e.g. as information related to the designated data transmission rate) of the QoS protocol to a client device (e.g. the network entity 300). The apparatus may be configured to receive data (e.g. the data transmission) from the client device based on a traffic behavior adapted based on the transmitted QoS protocol information.

Examples further provide a CPE/Gateway/Router comprising an apparatus according to one of the previous examples. The CPE/Gateway/Router may further comprise a wireless communication circuit configured to transmit data through the wireless communication link.

Examples further provide a wireless communication system comprising a CPE/Gateway/Router according to one of the examples and a wireless communication device (e.g. the network entity 300) configured to transmit data over the wireless communication link, wherein the wireless communication device is positionable at a place different from a position of the CPE/Gateway/Router.

Examples further provide a client device comprising a processor circuit configured to receive a QoS protocol information (e.g. the information related to the designated data transmission rate) of a QoS protocol determined by a CPE/Gateway/Router (e.g. the network gateway 100), wherein the processor circuit is configured to trigger an adaptation of a traffic behavior for data transmission of the client device based on the QoS protocol information.

Examples further provide a method for determining a data communication bandwidth for transmission of data. The method comprises determining a data communication bandwidth based on a bandwidth of a wireless communication link and at least on of an attenuation information of the wireless communication link and an environmental information of an area of the wireless communication link.

Examples further provide a non-transitory computer readable medium containing computer code that, when executed, performs the method of any of the previous examples.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for determining information related to a data communication bandwidth for a wireless link, the apparatus comprising:

at least one interface for communicating with a wireless modem circuit;

a control module configured to:

obtain information related to an instantaneous data transmission capacity of the wireless link between the wireless modem circuit and another device via the at least one interface, and identify an environmental factor near the wireless modem circuit and the another device, wherein the environmental factor is identified based on a measurement report;

determine the information related to the data communication bandwidth based on the information related to the instantaneous data transmission capacity of the wireless link and the environmental factor; and provide a data transmission to the wireless modem circuit for transmission via the wireless link based on the information related to the data communication bandwidth.

2. The apparatus of claim 1, wherein the information related to the data communication bandwidth is determined by:

determining a forecast for the data communication bandwidth.

3. The apparatus of claim 2, the forecast being determined based on both the instantaneous data transmission capacity and the environmental factor.

4. The apparatus of claim 2, the forecast being determined based on both the instantaneous data transmission capacity and past data related to one or more data transmissions of the wireless link.

5. The apparatus of claim 2, wherein the forecast is periodically adjusted based on additional accumulation of data.

6. The apparatus of claim 5, wherein the forecast is periodically adjusted based on a learning model that is updated based on the additional accumulation of data.

7. The apparatus of claim 2, wherein the forecast is determined based on a learning model that uses a plurality of factors.

8. The apparatus of claim 7, wherein the plurality of factors include at least one of: an attenuation factor, an estimated bandwidth factor, a weather factor, an environmental factor, an energy saving factor, a scheduling factor, or a quality of service (QoS) factor.

9. The apparatus of claim 2, wherein the forecast is determined based on a current physical layer (PHY) parameter or a current PHY condition.

10. The apparatus of claim 9, the current PHY parameter includes an attenuation factor.

11. The apparatus of claim 1, wherein when determining the information related to the data communication bandwidth, the control module is configured to make an adjustment to a transport algorithm based on at least one of the instantaneous data transmission capacity or the environmental factor.

12. The apparatus of claim 1, wherein when determining the information related to the data communication bandwidth, the control module is configured to make an adjustment to a transport algorithm based on a traffic priority or a quality of service (QoS) factor.

13. The apparatus of claim 1, wherein when determining the information related to the data communication bandwidth, the control module is configured to make an adjustment, the adjustment including a bitrate change, a traffic priority change.

14. A method, comprising:

obtaining information related to an instantaneous data transmission capacity of a wireless link between a wireless modem circuit and another device via at least one interface, and identifying an environmental factor near the wireless modem circuit and the another device, wherein the environmental factor is identified based on a measurement report;

determining the information related to a data communication bandwidth based on the information related to the instantaneous data transmission capacity of the wireless link and the environmental factor; and;

providing a data transmission to the wireless modem circuit for transmission via the wireless link based on the information related to the data communication bandwidth.

15. The method of claim 14, wherein the information related to the data communication bandwidth is determined by determining a forecast for the data communication bandwidth.

16. The method of claim 15, the forecast being determined based on both the instantaneous data transmission capacity and the environmental factor.

17. The method of claim 15, the forecast being determined based on both the instantaneous data transmission capacity and past data related to one or more data transmissions of the wireless link.

18. The method of claim 15, wherein the forecast is periodically adjusted based on additional accumulation of data.

19. The method of claim 14, wherein determining the information related to the data communication bandwidth comprises making an adjustment to a transport algorithm based on a traffic priority or a quality of service (QoS) factor.

20. The method of claim 14, wherein determining the information related to the data communication bandwidth comprises making an adjustment, the adjustment including a bitrate change, a traffic priority change.

* * * * *